United States Patent
Fontenot et al.

(10) Patent No.: US 9,172,719 B2
(45) Date of Patent: Oct. 27, 2015

(54) INTERMEDIATE TRUST STATE

(71) Applicant: International Business Machines Corporation, Armonk, NY (US)

(72) Inventors: Nathan D. Fontenot, Georgetown, TX (US); Jeffrey D. George, Austin, TX (US); Ryan P. Grimm, Austin, TX (US); Joel H. Schopp, Austin, TX (US); Michael T. Strosaker, Austin, TX (US); George C. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 14/135,759

(22) Filed: Dec. 20, 2013

(65) Prior Publication Data

US 2015/0180897 A1 Jun. 25, 2015

(51) Int. Cl.
*H04L 12/24* (2006.01)
*H04L 29/06* (2006.01)

(52) U.S. Cl.
CPC .................................. *H04L 63/1441* (2013.01)

(58) Field of Classification Search
CPC .................................................. H04L 12/2415
See application file for complete search history.

(56) References Cited

U.S. PATENT DOCUMENTS

| | | | |
|---|---|---|---|
| 8,280,833 B2 * | 10/2012 | Miltonberger | 706/45 |
| 8,396,890 B2 | 3/2013 | Lim | |
| 8,856,922 B2 * | 10/2014 | Rubinstein et al. | 726/22 |
| 8,862,526 B2 * | 10/2014 | Miltonberger | 706/15 |
| 2003/0229782 A1 * | 12/2003 | Bible et al. | 713/155 |
| 2004/0111632 A1 * | 6/2004 | Halperin | 713/200 |
| 2010/0094767 A1 * | 4/2010 | Miltonberger | 705/325 |
| 2010/0094791 A1 * | 4/2010 | Miltonberger | 706/46 |
| 2012/0159564 A1 | 6/2012 | Spektor et al. | |
| 2012/0297477 A1 | 11/2012 | Raviv | |
| 2012/0297484 A1 | 11/2012 | Srivastava | |
| 2013/0018823 A1 | 1/2013 | Masood | |
| 2013/0139236 A1 * | 5/2013 | Rubinstein et al. | 726/7 |
| 2014/0122627 A1 * | 5/2014 | Arnold | 709/206 |

\* cited by examiner

*Primary Examiner* — Josnel Jeudy
(74) *Attorney, Agent, or Firm* — Lieberman & Brandsdorfer, LLC

(57) ABSTRACT

Embodiments of the invention relate to implementation of an intermediate trusted state of an electronic account based upon questionable account communication(s). A profile of malicious or unauthorized activity is created, and a profile of account activity is created. As account activity takes place, the activity is assessed against one or both of the profiles to statistically determine if the activity resembles that associated with malicious or unauthorized intent. The state of the account is placed in the intermediate trusted state if the activity statistically matches the unauthorized activity profile. An authentication activity enables the trusted state to be removed and for the account activity to resume.

20 Claims, 6 Drawing Sheets

INTERMEDIATE TRUST STATE

BACKGROUND

The present invention relates to authentication of an electronic account. More specifically, the invention relates to use of an intermediate trust state for the account based on suspicion of the account being compromised.

In recent years there has been exponential growth and development of electronic communication. Many people have electronic mail accounts and social media accounts. For example, one person may have a personal electronic mail account, a work email account, and one or more social media accounts. Access to each of these accounts require authentication of a user name and an associated password. If the authentication fails, the user is not permitted access to the associated account.

A malicious or unauthorized user is a person who uses programming skills to gain unauthorized access to a computer network, file, and/or account. The malicious or unauthorized user generally gains access to an account by obtaining the user name and password, or through a security breach. In either situation, once the malicious or unauthorized user has access, the account is compromised and the account may then be used by the malicious or unauthorized user for inappropriate activity, including corporate surveillance and unlawful taking of an identity. Accordingly, there is a need to limit the ability of a malicious or unauthorized user to gain access to an electronic account.

BRIEF SUMMARY

The invention includes a method, computer program product, and system for mitigating unauthorized access to an electronic account.

A method, computer program product, and system are provided for managing an account with respect to unauthorized activity. Two statistics are generated and employed to validate suspicion of unauthorized account activity, including a first statistic generated from a corpus of account behavior, and a second statistic generated from a corpus of malicious or unauthorized user behavior. In response to detection of an activity on the account, a comparison of the detected activity to at least one of the first statistic and the second statistic is conducted. If the comparisons pass, the activity on the account is enabled. However, if at least one of the comparisons fails, this is an indication that a mistrust with the detected first activity has been detected. The account is placed in an intermediate trust state based in the discovered mistrust. This intermediate state suspends all future activities until validation of a remediation activity.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings reference herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Reference is made to analyzing account behavior. As an account is accessed, certain characteristics may be ascertained. Account characteristics and associated behavior may include text characteristics, such as spelling and grammar, phrases used, time of day when account is accessed, frequency of access, location from where the account is accessed, links embedded or attached to incoming or outgoing communications, etc. Accordingly, patterns of use of an account may be learned based upon repeated actions.

There are two categories of behavior that are pertinent. One category is associated with the owner of an account, otherwise known as an account user. As the owner accesses their account, their behavior may be evaluated to develop an account profile. Another category is associated with an unauthorized access of the account. A person who uses programming skills to gain illegal or unauthorized access to an electronic account or file is referred to herein as a malicious or unauthorized user. The behavior of a malicious or unauthorized user on the account may differ from the behavior of an authorized access of the account. A profile of malicious or unauthorized user behavior may be generated from prior unauthorized access to the same or a different account. In one embodiment, a malicious or unauthorized user profile has different characteristics from an authorized account profile. Accordingly, the malicious or unauthorized user profile and account profile may be employed to identify account behavior.

Figure 1:
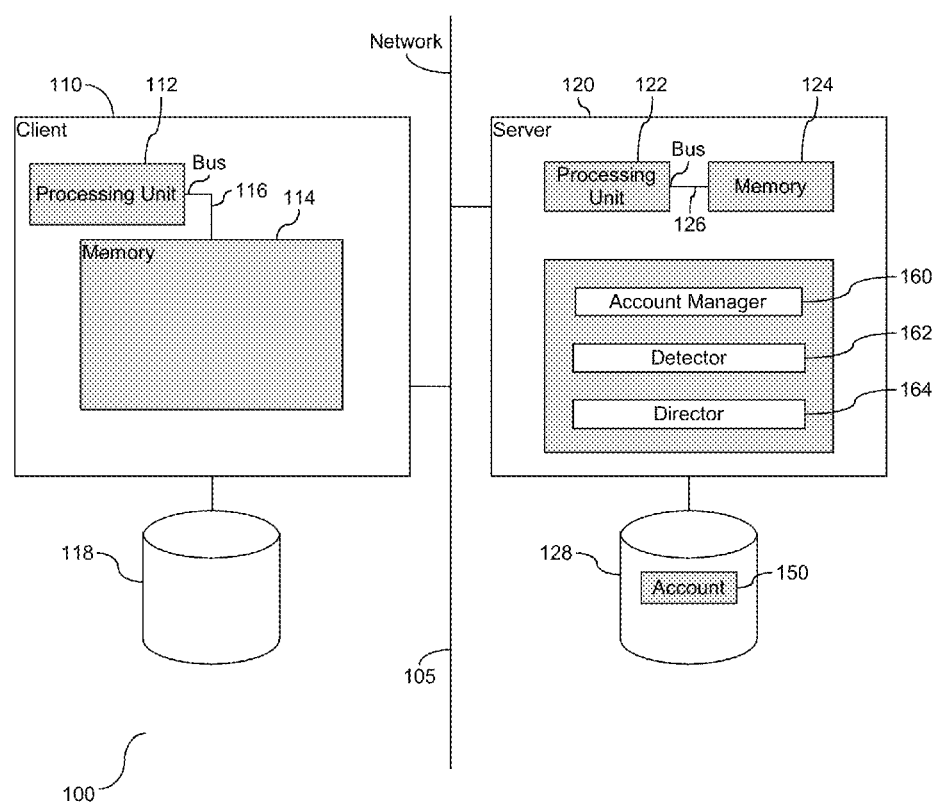
FIG. 1 depicts a block diagram illustrating tools embedded in a computer system to support detection of unauthorized account activity and associated remedial measures.

Referring to FIG. 1, a block diagram (100) is provided illustrating tools embedded in a computer system to support detection of unauthorized account activity and associated remedial measures. As shown, a client machine (110) is provided in communication with a server (120). Although only one client machine (110) is shown, in one embodiment, multiple client machines may be provided in communication with the server (120) across a network connection (105). The client machine (110) is provided with a processing unit (112) operatively coupled to memory (114) across a bus (116). In one embodiment, the client machine is provided with local storage (118). Similarly, the server (120) is provided with a processing unit (122) operatively coupled to memory (124) across a bus (126). In one embodiment, the server (120) is provided with local data storage (128). In one embodiment, data storage is provided in a remote data center (not shown) or a shared pool of resources (not shown) in communication with the server (120) across the network connection (105).

The server (120) is shown with tools in communication with the processing unit (122), the tools and processing unit (122) configured to manage an intermediate trust state in response to suspicion of unauthorized account activity. To further illustrate effective and efficient use of the intermediate trust state, an account (150) is provided. In the example shown herein, the account (150) is shown local to the server (120), although the location should not be considered limiting. For example, in one embodiment, the account (150) may be stored within a database (not shown) in communication with the server (120). An account manager (160) is provided to generate a first statistic from a collection of behavior associated with the account (150). In addition, the account manager (160) gathers a second statistic from a collection of malicious or unauthorized user behavior. In one embodiment, the second statistic is gathered from a secondary source external to the account. The generated statistics characterize account behavior, and in one embodiment may be employed to create an account profile based on account activity. Accordingly, the account manager (160) functions to observe account activity and to generate an account profile and associated statistical data based on the observation.

Unless the account is non-active, the account will be subject to some form of activity. Such activities include incoming and outgoing communications, and logging onto the account, as well as logging off the account. A detector (162) is provided in communication with the account manager (160) and functions to observe and detect account activity. More specifically, the detector (162) communicates with the manager (160) to compare the detected activity to both the account activity behavior and to the collection of malicious or unauthorized user behavior. The comparison may yield a concern associated with the detected account activity. More specifically, the comparison may provide data that is indicative of malicious or unauthorized user behavior. In order to prevent or mitigate malicious or unauthorized user access to an account, remedial measures may be employed to reduce the effects of malicious or unauthorized user activity. If the comparison performed by the detector (162) yields data that the detected activity may be associated with a malicious or unauthorized user activity, then the detector (162) places the account (150) into an intermediate trust state. In this state, certain account activities, such as a subset of account activities, are suspended according to a pre-determined intermediate trust state policy. In one embodiment, the intermediate state remains until validation of a remediation activity. Similarly, in one embodiment, the intermediate trust state is a suspension of the account. Accordingly, the intermediate trust state temporarily suspends a selection of one or more future activities associated with an account until verification that the suspicious activity is not associated with a malicious or unauthorized user.

While the account is in the intermediate trust state, the account remains active from an external perspective. For example, the account may give an appearance of being active and available, and at the same time continue to receive requests. However, processing of select received requests may be held and not processed until either authentication of the remediation activity or a reset of the account. The remediation activity is presented or otherwise activated in response to a discovered suspicious activity or in response to a second activity initiated with the account when the account is already in the intermediate trust state. The remediation activity may take on different forms, with the essence of the activity requiring the verification that the activity on the account that caused entry to the trust state is not malicious or unauthorized user based. For example, the remediation activity may require answering a secret question, a second authentication, such as a presentation of a code, biometric authentication, social media authentication, etc. A director (164) is provided in communication with the detector (162). The director (164) functions to return the account to a non-suspended state. More specifically, at such time as the director (164) authenticates the remediation activity, the director (164) removes the intermediate trust state and returns the account to a non-suspended state, which allows and enables activity with the account to resume. At the same time, if the director (164) does not authenticate the remediation, the remediation fails and the account remains in the suspended state. In addition, the director (164) initiates a reset of the account. Accordingly, the intermediate trust state is employed with the tools to manage activity associated with an account.

As identified above, the manager (160), detector (162), and director (164) are shown residing local to the server (120). In one embodiment, the manager (160), detector (162), and director (164) may reside as one or more applications in memory (124) or as one or more hardware tools external to the memory (124). In another embodiment, the manager (160), detector (162), and director (164) may be implemented as a combination of hardware and software. In the case of an embodiment with a pool of shared resources, such as a cloud computing environment, the manager (160), detector (162), and director (164) may be collectively or individually distributed across he shared pool of computer resources and function as a unit to support account management. Accordingly, the manager (160), detector (162), and director (164) may be implemented as one or more software tools, hardware tools, or a combination of software and hardware.

Figure 2:
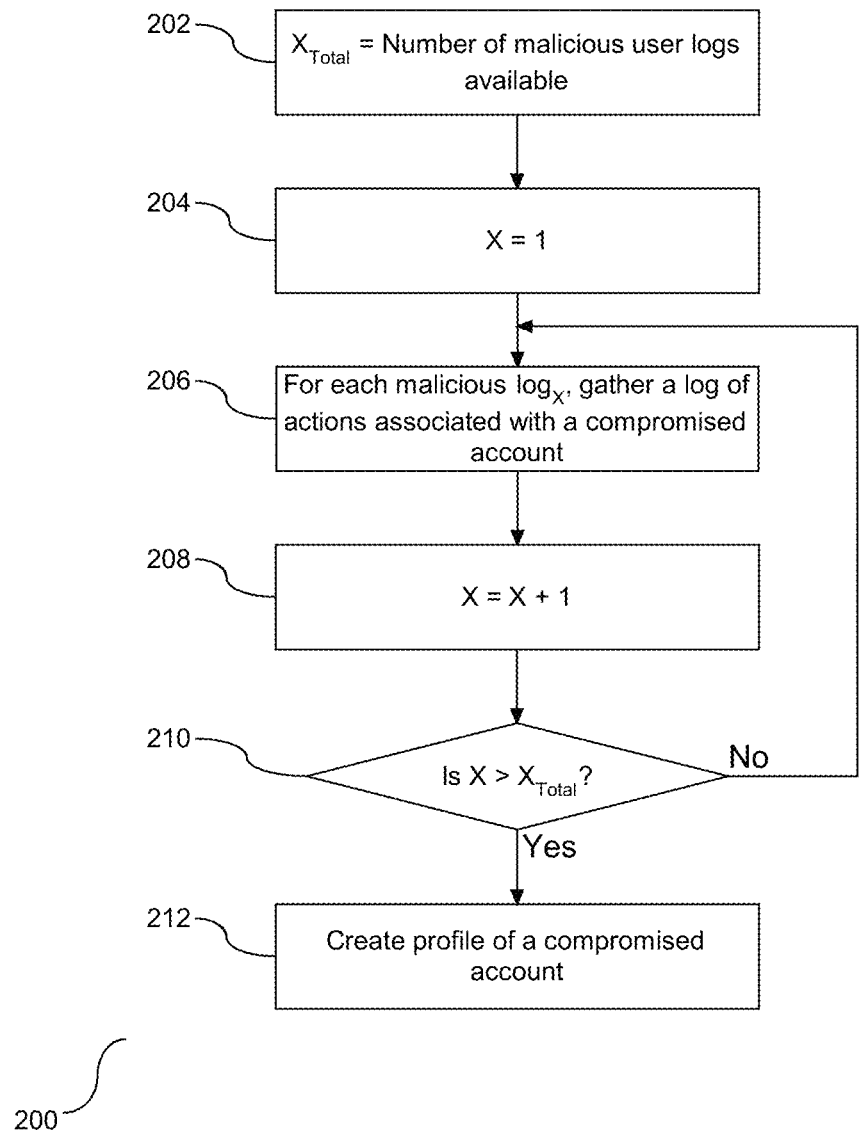
FIG. 2 depicts a flow chart illustrating a process for malicious or unauthorized user profile identification.

To further illustrate and as shown herein, FIG. 2 is a flow chart (200) illustrating a process for malicious or unauthorized user profile identification. The variable $X_{Total}$ is assigned to the number of malicious or unauthorized user logs available (202), and an associated counting variable X is initialized (204). For each malicious or unauthorized user $log_X$, a log of actions associated with a compromised account is gathered (206). The logs may be gathered from various sources. In one embodiment, the log is obtained from this account or a different account being managed and was previously determined to have been compromised. Similarly, in one embodiment, the malicious or unauthorized user logs and associated malicious or unauthorized user activity may be known and available. Similarly, in one embodiment, there may be a plurality of malicious or unauthorized user logs, as each malicious or unauthorized user may have a different manner of committing the unauthorized activity, which would entail a log of different activities. Following step (206), the counting variable X is incremented (208), and it is determined if all of the logs have been assessed (210). A negative response to the determination at step (210) is followed by a return to step (206) and a positive response is followed by creation of a profile of a compromised account (212). Specifically, statistical analysis is performed on the gathered malicious or unauthorized user log data to create a malicious or unauthorized user profile. A variety of statistical analysis and modeling tools may be employed for the profile creation at step (212), including but not limited to, Bayes, Markoff, etc. Accordingly, the malicious or unauthorized user profile may be ascertained from a single log of unauthorized account activity or from a combination of multiple logs.

The malicious or unauthorized user profile may be dynamically generated. Specifically, malicious or unauthorized user activity has been known to increase over time, and characteristics of these malicious or unauthorized user activities continue to morph. To maintain a current and accurate model, the profile accounts for current activity. In one embodiment, the profile generation process demonstrated in FIG. 2 is activated in response to detection and/or verification of malicious or unauthorized user activity. The dynamic response enables the profile to remain current. Accordingly, the creation of the profile may be continuously re-generated on a dynamic basis in response to malicious or unauthorized user activity.

Figure 3A:
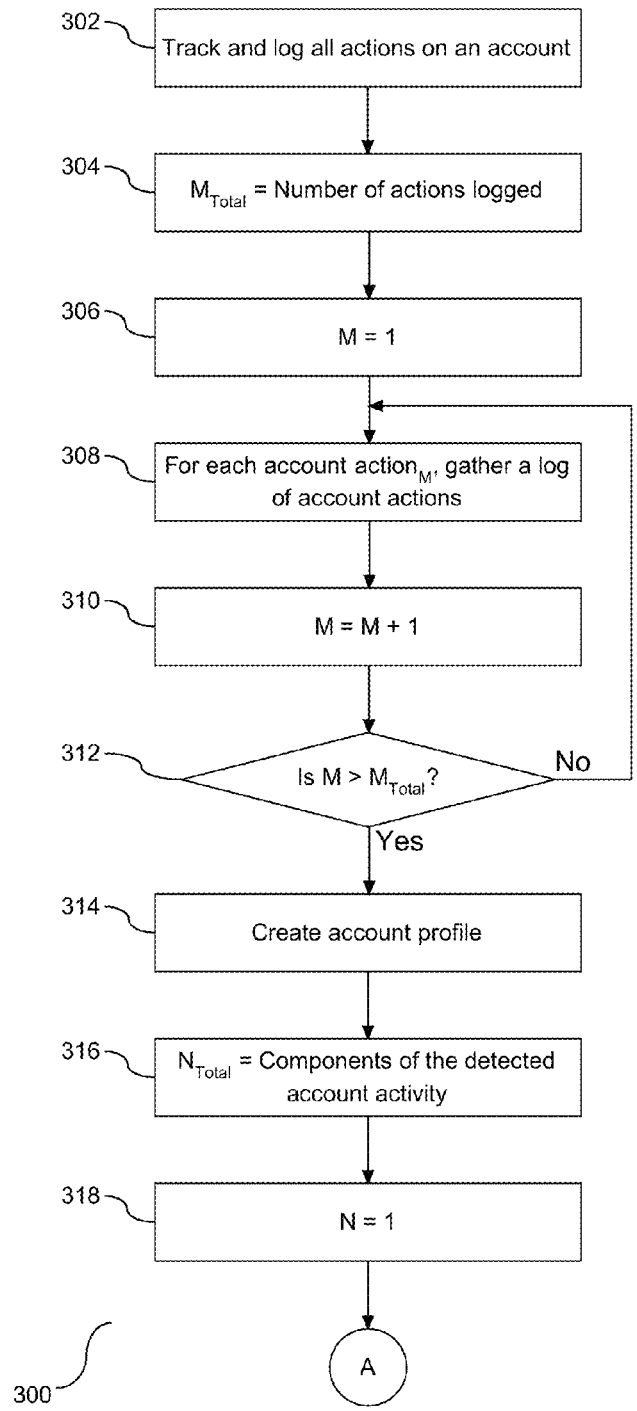
FIGS. 3A and 3B depict a flow chart illustrating management of an account based on account activity.
Figure 3B:
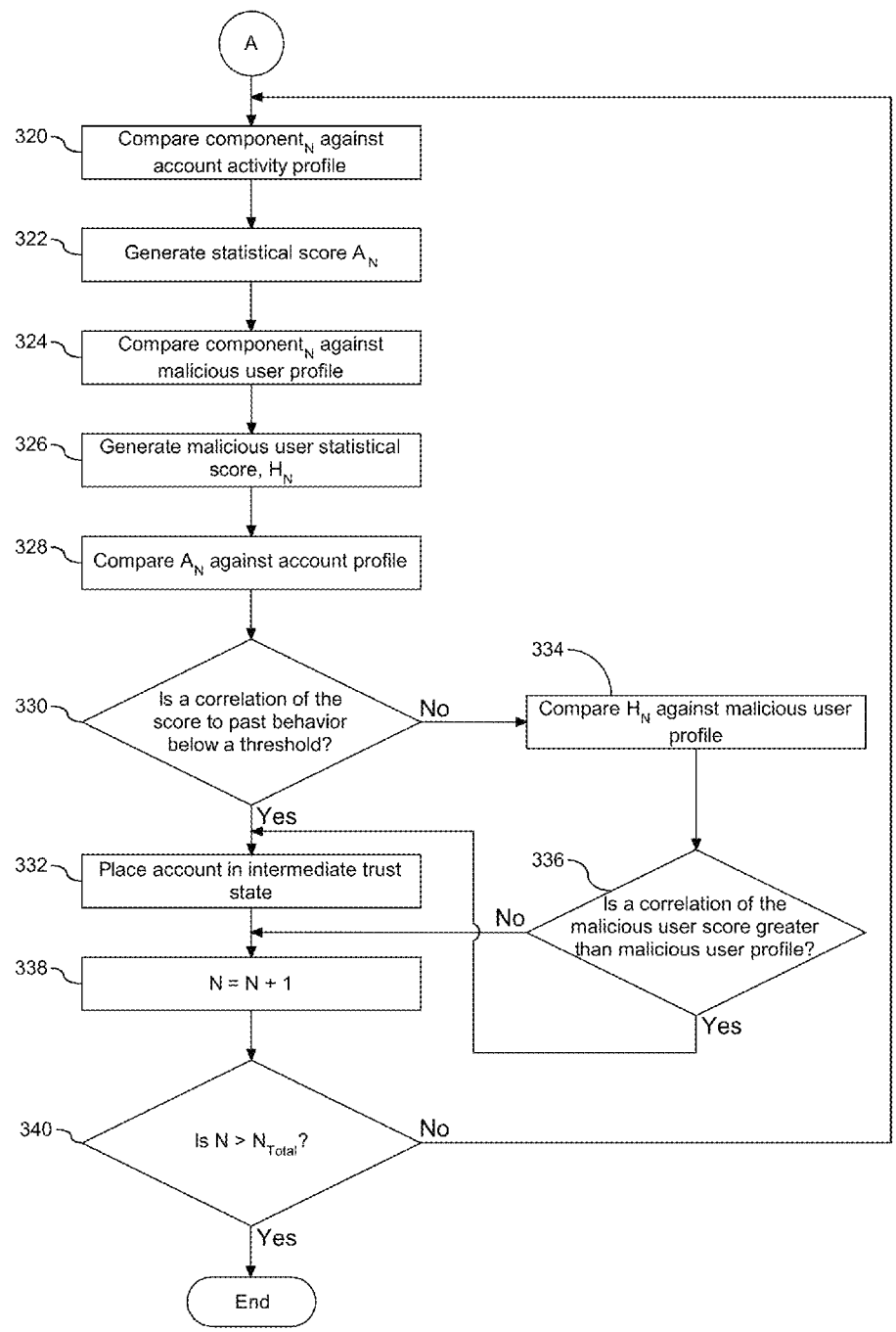

Referring to FIGS. 3A and 3B is a flow chart (300) illustrating management of an account based on account activity. All actions on the account are tracked and logged (302). The variable $M_{Total}$ is assigned to the number of account actions logged (304), and an associated counting variable M is initialized (306). For each account action$_M$, a log of account actions is gathered (308). Different accounts are subject to different experiences, and as such each account needs to be separately tracked and managed. Following step (308), the counting variable M is incremented (310), and it is determined if all of the logs have been assessed (312). A negative response to the determination at step (312) is followed by a return to step (308) and a positive response is following by creation of a profile of the account (314). Specifically, statistical analysis is performed on the gathered account log data to create an account profile. A variety of statistical analysis and modeling tools may be employed for the profile creation at step (314), including but not limited to, Bayes, Markoff, etc. Accordingly, the account profile may be ascertained from a single log of account activity, or from a combination of multiple logs.

The account profile may be dynamically generated. Specifically, account activity changes each time the account is accessed, and characteristics of these account activities may change. To maintain a current and accurate model, the profile accounts for current activity. In one embodiment, the profile generation process demonstrated in FIGS. 3A and 3B is activated in response to detection and/or verification of account activity. The dynamic response enables the profile to remain current. Accordingly, the creation of the profile may be continuously re-generated on a dynamic basis in response to account activity.

As shown herein, two profiles are created, including an account profile and a malicious or unauthorized user profile. The account profile is based on statistical data associated with account activities. In response to detecting activity for the account to process and prior to processing, the detected activity is parsed into components that comprise the activity. Components of activity may include, but are not limited to input, location, directory access, grammar, spelling, text, etc. The variable $N_{Total}$ is assigned to the components of the detected account activity (316). An associated component counting variable N is initialized (318). Each component$_N$ of the activity is compared against the account activity profile (320), and an associated account statistical score, $A_N$, is generated for component$_N$ (322). In addition, each component$_N$ of the activity is compared against the malicious or unauthorized user profile (324), and an associated malicious or unauthorized user statistical score, $H_N$, is generated for component$_N$ (326). Accordingly, two statistical scores are created for each component of the account activity.

Following step (326), the account statistical score, $A_N$, is compared against the account profile (328) and it is determined if a correlation of the score to past account behavior is below a threshold (330). A positive response to the determination at step (330) is an indication that the activity on the account may be unauthorized, and the account is placed in an intermediate trust state (332). However, a negative response to the determination at step (330) is followed by comparison of the malicious or unauthorized user statistical score, $H_N$, against the malicious or unauthorized user profile (334). It is then determined if a correlation of the malicious or unauthorized user score exceeds a defined malicious or unauthorized user threshold (336). A positive response to the determination at step (336) is followed by a return to step (332). Accordingly, each component of the received account activity is evaluated for possible unauthorized account activity.

Each component of the account activity being assessed is separately evaluated for unauthorized characteristics. Following step (332) or a negative response to the determination at step (336), the component counting variable, N, is incremented (338). It is then determined if all of the components have been evaluated (340). A negative response to the determination at step (336) is followed by a return to step (320) for continued component evaluation. However, a positive response to the determination at step (338) concludes the component evaluation process.

As demonstrated in FIGS. 3A and 3B, an account may be placed in the intermediate trust state based upon statistical analysis against either or both of the account profile and the malicious or unauthorized user profile. In one embodiment, the distance between the activity component(s) and the profiles is determinative of possible malicious or unauthorized activity of the account. In response to the placement of the account into the intermediate trust state, certain account activities may be temporarily held in suspension and the suspicious activity that caused the state change of the account is placed on hold. Accordingly, there are two immediate reactions to the identified suspicious activity.

Figure 4:
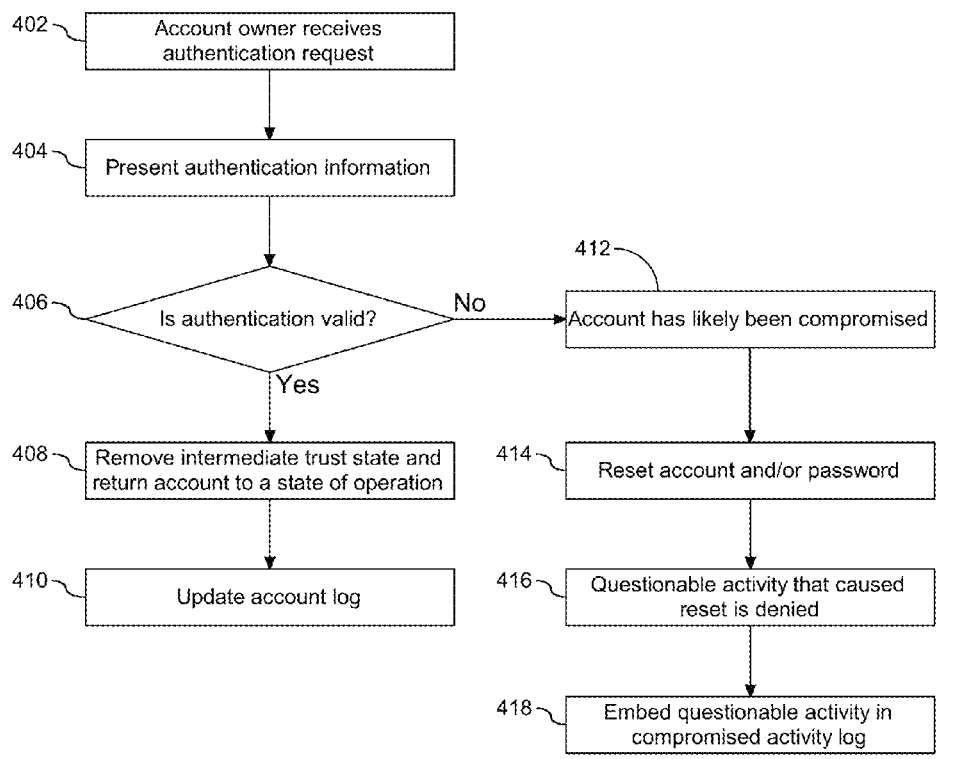
FIG. 4 depicts a flow chart illustrating one embodiment of the remediation process.

In addition to the possible immediate holds associated with the account, remediation takes placed. FIG. 4 is a flow chart (400) depicting one embodiment of the remediation process. The owner of the account receives an authentication request (402). The authentication may be presented in various forms, including but not limited to, a secret question, biometric authentication, social media verification, etc. After the authentication information is presented by the account holder (404), the information is verified to determine if the authentication is valid (406). A positive response to the authentication verification is followed by removal of the intermediate trusted state and returns the account to a state of operation (408). In the operating state, account activity is returned and the questionable activity that caused the account suspension is processed. The account log is updated so that the next time the account profile is updated this activity will be reflected in the account profile (410). However, a negative response to the authentication verification is an indication that the account has likely been compromised (412). The account and/or associated password are reset (414). Following the reset, the account activity resumes. However, the questionable activity that caused the reset is denied and is therefore not processed (416). In addition, the questionable activity is embedded in the unauthorized activity log so that the next time the unauthorized activity profile is updated this activity will be reflected in the profile (418). Accordingly, remedial measures are implemented for the account in response to failure of authentication verification for identified suspicious activity.

The server described above in FIG. 1 has been labeled with tools in the form of a manager (160), a detector (162), and a director (164). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 5:
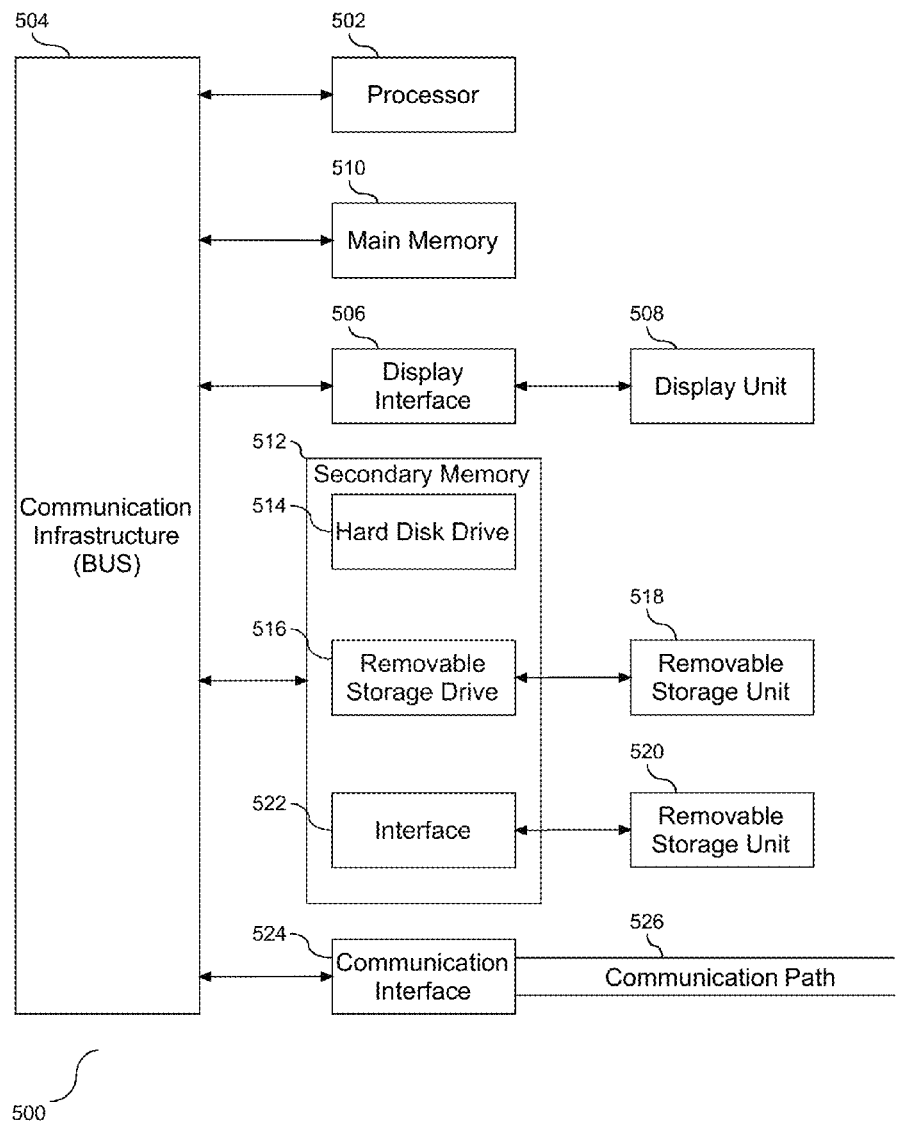
FIG. 5 depicts a block diagram of a computing environment according to an embodiment of the present invention.

Referring now to the block diagram of FIG. 5, additional details are now described with respect to implementing an embodiment of the present invention. The computer system includes one or more processors, such as a processor (502). The processor (502) is connected to a communication infrastructure (504) (e.g., a communications bus, cross-over bar, or network).

The computer system can include a display interface (506) that forwards graphics, text, and other data from the communication infrastructure (504) (or from a frame buffer not shown) for display on a display unit (508). The computer system also includes a main memory (510), preferably random access memory (RAM), and may also include a secondary memory (512). The secondary memory (512) may include, for example, a hard disk drive (514) and/or a removable storage drive (516), representing, for example, a floppy disk drive, a magnetic tape drive, or an optical disk drive. The removable storage drive (516) reads from and/or writes to a removable storage unit (518) in a manner well known to those having ordinary skill in the art. Removable storage unit (518) represents, for example, a floppy disk, a compact disc, a magnetic tape, or an optical disk, etc., which is read by and written to by removable storage drive (516).

In alternative embodiments, the secondary memory (512) may include other similar means for allowing computer programs or other instructions to be loaded into the computer system. Such means may include, for example, a removable storage unit (520) and an interface (522). Examples of such means may include a program package and package interface (such as that found in video game devices), a removable memory chip (such as an EPROM, or PROM) and associated socket, and other removable storage units (520) and interfaces (522) which allow software and data to be transferred from the removable storage unit (520) to the computer system.

The computer system may also include a communications interface (524). Communications interface (524) allows software and data to be transferred between the computer system and external devices. Examples of communications interface (524) may include a modem, a network interface (such as an Ethernet card), a communications port, or a PCMCIA slot and card, etc. Software and data transferred via communications interface (524) is in the form of signals which may be, for example, electronic, electromagnetic, optical, or other signals capable of being received by communications interface (524). These signals are provided to communications interface (524) via a communications path (i.e., channel) (526). This communications path (526) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (510) and secondary memory (512), removable storage drive (516), and a hard disk installed in hard disk drive (514).

Computer programs (also called computer control logic) are stored in main memory (510) and/or secondary memory (512). Computer programs may also be received via a communication interface (524). Such computer programs, when run, enable the computer system to perform the features of the present invention as discussed herein. In particular, the computer programs, when run, enable the processor (502) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of an intermediate trusted state of an electronic account based upon questionable account communication(s) places the state of the account in the intermediate trusted state if the activity statistically matches the unauthorized activity profile and through an authentication enables the trusted state to be removed and for the account activity to resume.

Alternative Embodiment

It will be appreciated that, although specific embodiments of the invention have been described herein for purposes of illustration, various modifications may be made without departing from the spirit and scope of the invention. In particular, unauthorized or compromised activity may differ based on characteristics of the account. For example, a compromised commercial account may have different characteristics from a compromised consumer account. To address this, the creation of the malicious or unauthorized user profile may vary depending on the account type, and the malicious or unauthorized user profile may then be selected based on the account type. Accordingly, the scope of protection of this invention is limited only by the following claims and their equivalents.

We claim:

1. A method for managing activity of an electronic account comprising:
   accessing a corpus of account behavior associated with the electronic account stored at a first memory location, and a corpus of unauthorized user behavior associated with a history of unauthorized access stored at a second memory location, wherein the history of unauthorized access is selected from the group consisting of: prior unauthorized access to the electronic account, prior unauthorized access to other electronic accounts, and a combination thereof;
   generating a first statistic from the corpus of account behavior and a second statistic from the corpus of unauthorized user behavior;
   detecting a first activity on the electronic account;
   discovering mistrust associated with the detected first activity, including comparing the detected first activity to a statistic selected from the group consisting of: the first statistic and the second statistic;
   producing a mistrust notification in response to discovered mistrust; and
   converting the electronic account into an intermediate trust state based on the produced mistrust notification.

2. The method of claim 1, further comprising detecting a second activity on the electronic account while the electronic account is in the intermediate trust state, and activating a remediation activity in response to the detected second activity.

3. The method of claim 2, further comprising allowing the detected second activity in response to a pass of the remediation activity.

4. The method of claim 3, further comprising removing the intermediate trust state placed on the account prior to activation of the second activity.

5. The method of claim 2, further comprising denying the detected second. activity in response to a fail of the remediation activity, and resetting the account.

6. The method of claim 1, wherein comparing comprises separating the detected activity into multiple components, and generating an account statistic and an unauthorized user statistic for each component.

7. The method of claim 1, further comprising the intermediate trust state suspending a sub-set of account activities according to a pre-determined intermediate trust state policy.

8. A computer program product for managing activity of an electronic account, the computer program product comprising a computer readable storage device having program code embodied therewith, the program code executable by a processing unit to:
   access a corpus of account behavior associated with the electronic account stored at a first memory location, and a corpus of unauthorized user behavior associated with a history of unauthorized access stored at a second memory location, wherein the history of unauthorized access is selected from the group consisting of: prior unauthorized access to the electronic account, prior unauthorized access to other electronic accounts, and a combination thereof;
   generate a first statistic from the corpus of account behavior and a second statistic from the corpus of unauthorized user behavior:
   detect a first activity on the account;
   discover mistrust associated with the detected first activity, including comparing the detected first activity to at least one of the first statistic and the second statistic;
   produce a mistrust notification in response to discovered mistrust; and
   convert the electronic account into an intermediate trust state based on the produced mistrust notification.

9. The computer program of claim 8, further comprising program code to detect a second activity on the electronic account while the electronic account is in the intermediate trust state, and to activate a remediation activity responsive to the detected second activity.

10. The computer program product of claim 9, further comprising program code to allow the detected second activity in response to a pass of the remediation activity.

11. The computer program product of claim 10, further comprising program code to remove the intermediate trust state placed on the account prior to activation of the second activity.

12. The computer program product of claim 9, further comprising program code to deny the detected second activity in response to a fail of the remediation activity, and the program code to reset the account.

13. The computer program product of claim 9, wherein comparing comprises the program code to separate the detected activity into multiple components, and to generate an account statistic and an unauthorized user statistic for each component.

14. The computer program product of claim 8, further comprising program code for the intermediate trust state to suspend a sub-set of account activities according to a pre-determined intermediate trust state policy.

15. A computer system for managing activity of an electronic account comprising:
   a processing unit operatively coupled to memory;
   a tool in communication with the processing unit to manage the activity, including:
      access a corpus of account behavior associated with the electronic account stored at a first memory location, and a corpus of unauthorized user behavior associated with a history of unauthorized access stored at a second location, wherein the history of unauthorized access is selected from the group consisting of: prior unauthorized access to the electronic account, prior unauthorized access to other electronic accounts, and a combination thereof;
      generate a first statistic from the corpus of account behavior and a second statistic from the corpus of unauthorized user behavior;
      detect a first activity on the account and to discover mistrust associated with the detected first activity, including comparing the detected first activity a statistic selected from the group consisting of: the first statistic and the second statistic; and
      convert the electronic account into an intermediate trust state based on the produced mistrust.

16. The system of claim 15, further comprising the tool to detect a second activity on the electronic account while the electronic account is in the intermediate trust state, and to activate a remediation activity for the account responsive to the detected second activity.

17. The system of claim 16, further comprising the tool to allow the detected second activity in response to a pass of the remediation activity.

18. The system of claim 17, further comprising the tool to remove the intermediate trust state placed on the account prior to activation of the second activity.

19. The system of claim 16, further comprising the tool to deny the second activity in response to a fail of the remediation activity, and to reset the account.

20. The system of claim 15, wherein comparing comprises the tool to separate the detected activity into multiple components, and to generate an account statistic and an unauthorized user statistic for each component.

* * * * *